Aug. 27, 1963 D. L. EICHENBERGER ETAL 3,102,236

SQUELCH CIRCUIT CONTROLLED BY DEMODULATED VOICE SIGNAL

Filed May 5, 1960

INVENTORS
DONALD L. EICHENBERGER
EDGAR O. SCHOENIKE
BY Moody and Antrim
AGENTS

United States Patent Office 3,102,236
Patented Aug. 27, 1963

3,102,236 SQUELCH CIRCUIT CONTROLLED BY DEMODULATED VOICE SIGNAL

Donald L. Eichenberger and Edgar O. Schoenike, Cedar Rapids, Iowa, assignors to Collins Radio Company, Cedar Rapids, Iowa, a corporation of Iowa Filed May 5, 1960, Ser. No. 27,069
6 Claims. (Cl. 325—478)

Figures 1, 2:
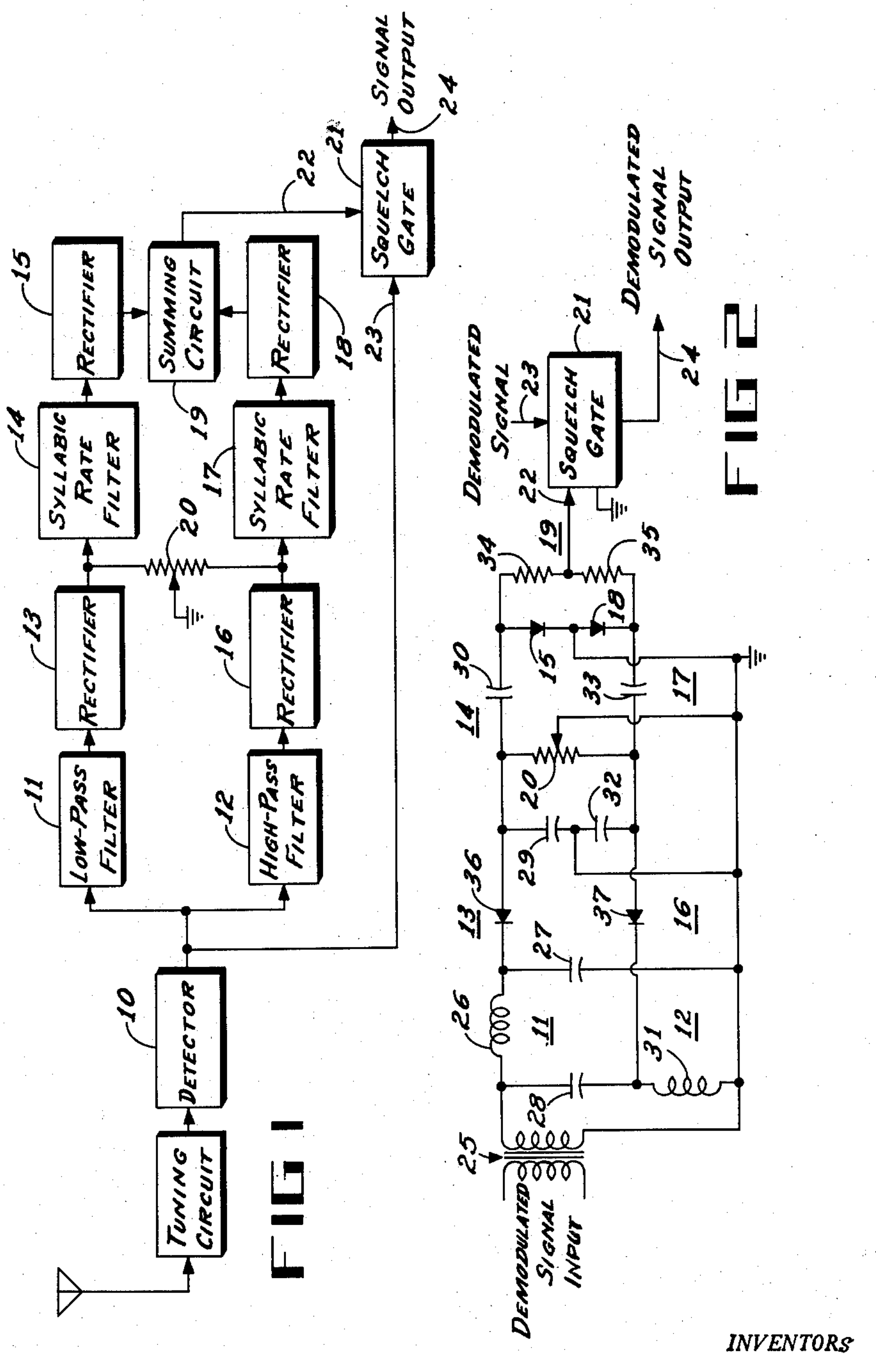

This invention pertains to squelch or noise suppression systems and more particularly to squelch systems for completing the audio-frequency output circuits of receivers only during the reception of modulated voice signals. Squelch systems according to this invention may be incorporated in receivers that are designed for reception of radio-frequency signals of various types of carrier modulation, but it is particularly adaptable to receivers for reception of single side-band signals in which little or no carrier is present to indicate the level of the received signal.

Certain prior signal-to-noise squelch control circuits have operated on the principle of energy distribution comparison. A system utilizing this principle is described in U.S. Patent 2,852,622 issued to C. D. Fedde et al. on September 16, 1958. The Fedde, et al. system includes in the squelch control circuit two channels having different frequency band-pass characteristics. One of the channels passes signals within the frequency range which contains most all of the power of the incoming audio-frequency signal. The other channel passes noise signals which have frequencies generally somewhat higher than the frequencies of the incoming signals which are passed by the first channel. This prior squelch control system is suitable for application in radio-receiving circuits in which the radio-frequency tuning circuits pass a sufficiently wide-band of frequencies to provide the noise signal which is outside the range of frequencies of voice signals. Not only is the prior signal-to-noise squelch control circuit inapplicable to narrow-band receiving systems, but it is unreliable when certain types of interference is being received. For example, a continuous disturbing low-frequency tone will complete the audio-frequency output circuit of the receiving system, and at other times a continuous high-frequency tone will disable the audio-frequency circuits, even though the tone would not cause excessive interference with the desired voice signal.

In order to avoid operation of a squelch control system by the type of interference which is a continuous tone, a syllabic rate filter rather than a two-channel energy distribution comparison circuit may be used in the squelch control system. The syllabic rate filter may be responsive to reception of signal varying at a rate between 0.5 to 25 cycles per second to develop a control voltage for completing audio-frequency circuits. This type of control system, when used by itself, may complete audio-frequency circuits in response to periodic noise pulses. The interference rejecting capabilities of both the energy distribution comparison circuit and the syllabic rate filter circuit may be incorporated in a single squelch system. The instant squelch circuit comprises a high-frequency band-pass channel and a low-frequency band-pass channel; each of these channels include a rectifier for developing a varying direct-current voltage which is proportional to the signal power within the frequency range passed by the respective channel; and each channel includes a syllabic rate filter and rectifier to which the varying direct-current voltage is applied for developing a control voltage; and a summing or subtraction circuit is connected to the output of each of the channels for developing a difference of the control voltages to be applied to a gating or switching circuit.

An object of the invention is to provide a voice-operated squelch circuit which completes receiving circuits only in response to the reception of voice-modulated signal.

Another object is to include in the squelch circuit energy distribution comparison means for obtaining a control voltage proportional to the signal-plus-noise to noise ratio of the incoming signal.

Another object is to provide a syllabic rate filter for eliminating pulse or adjacent channel interference.

A feature of this invention is the utilization of a relatively simple circuit which is easily and economically constructed.

The following description and the appended claims may be more readily understood with reference to the accompanying drawings in which:

FIGURE 1 is a block diagram of a receiving system that incorporates the voice-operated signal-to-noise squelch system of this invention; and FIGURE 2 is a detailed schematic diagram of the squelch circuit shown in FIGURE 1.

With reference to FIGURE 1 the output of receiver detector 10 is applied to the inputs of the two channels of the squelch control system. The input circuit of the low-frequency channel includes low-frequency band-pass filter 11 and the input circuit of the high-frequency channel includes high-frequency band-pass filter 12. Except for the difference in band-pass characteristics of filters 11 and 12, the two channels are similar. Filter 11 has broad band-pass characteristics with a center frequency of approximately 450 cycles per second, whereas filter 12 which also has broad band-pass characteristics has a center frequency at about 2,500 cycles per second.

The output of the low-frequency band-pass filter 11 which has those frequency components of the input demodulated signal containing maximum power is applied to rectifier 13 for developing a variable direct-current voltage for application through syllabic rate filter 14 to the input of another rectifier 15. The syllabic rate filter 14 eliminates the direct-current component applied from rectifier 13 and applies the resulting variable voltage to the other rectifier 15 for developing a direct-current voltage which varies at the syllabic rate of the incoming voice signal.

The high-frequency channel consists of similar circuits connected in an identical manner. The output of detector 10 is applied through high-pass filter 12 to rectifier 16. The varying direct-current voltage from rectifier 16 is applied through syllabic rate filter 17 to an output rectifier 18. The output of rectifier 15 which is proportional to the low-frequency components having most of the power of an incoming signal and the output of rectifier 18 which is proportional to the high-frequency components having lesser power of the signal is applied to voltage comparison or summing circuit 19. The output of circuit 19 is a direct-current voltage which is equal to the difference between the outputs applied from rectifiers 15 and 18.

The relative value of the voltages applied from rectifiers 15 and 18 to the comparison circuit is determined by an adjustment of potentiometer 20 which has each of its end terminals connected to a respective channel at the outputs of rectifiers 13 and 16. The arm of the potentiometer is connected to ground or the common return lead of the squelch control circuit. When the arm of potentiometer 20 is moved closer to that end terminal which is connected to the low-frequency channel, obviously the output of the low-freqency channel for application to the voltage comparison circuit is decreased. When the input to the squelch circuit is white noise, noise being equally distributed throughout the audio-frequency range of the two filters, potentiometer 20 is adjusted until the output of voltage comparison circuit 19 is zero. Squelch gate 21 has its input 22 connected to the output circuit of voltage comparison circuit 19 so that when the output of the low-frequency channel is larger than the output of the high-frequency channel, the squelch gate is operative for connecting the output of detector 10 through gate input 23 to signal output circuit 24.

A schematic diagram of a squelch circuit that has provided the best operation in view of its simplicity is shown in FIGURE 2. The demodulated signal from a detector circuit is coupled through transformer 25 to the inputs of low-frequency band-pass filter 11 and high-frequency band-pass filter 12. This transformer has attenuated low-frequency response below approximately 300 cycles per second in order to eliminate low-frequency interference. The low-pass filter 11 comprises serially connected inductor or choke 26 and parallel connected capacitor 27. The output of the low-pass filter is converted by a rectifier diode 36 and parallel filter or integrating capacitor 29 to a direct current varying at a low-frequency. The syllabic rate filter for the low-frequency channel includes serially connected capacitor 30 in addition to capacitor 29. The capacitor 30 blocks the direct-current component of the output of rectifier 13 and passes the components which are of sufficiently low-frequency to appear across parallel capacitor 29. These two capacitors and the rectifier are a syllabic rate detector for detecting signals varying between about 0.5 to 25 cycles per second.

The high-frequency band-pass filter 12 at the input of the high-frequency channel comprises series capacitor 28 and parallel connected choke 31. The remainder of the high-frequency channel is similar to that of the low-frequency channel. The rectifier 37 is connected between the high-frequency band-pass filter 12 and the syllabic rate filter which includes parallel capacitor 32 and series capacitor 33. The diode 18 rectifies the output of the syllabic rate filter.

The component parts in a typical squelch circuit of FIGURE 2 may have the following values. When these values are used the attack time, which is the time between the application of voice signal to the input and the completion of the signal output circuit, is 7 to 8 milliseconds; and the release or holding time after removal of the input signal is about 1.5 seconds.

*Capacitors*

| | Microfarads |
|---|---|
| 28 | .05 |
| 27 | 0.22 |
| 29, 32 | 10 |
| 30, 33 | 125 |

*Chokes*

| | Millihenries |
|---|---|
| 26 | 430 |
| 31 | 86 |

*Resistors*

| | Ohms |
|---|---|
| 20 | 10,000 |
| 34, 35 | 1,200 |

In normal operation a voice signal without interference will generate in the low-frequency channel a greater output voltage than that generated in the high-frequency channel. The output voltage of comparison or summing circuit 19 is then sufficient to operate squelch gate 21 for applying signal from detector 10 to signal output 24. The greater output voltage of the low-frequency channel is developed in response to the application of components of the voice signal below 1,000 cycles per second to rectifier 13. Components of the voice signal above 1,000 cycles per second in the high-frequency channel are weaker and therefore are not as effective in developing output voltage.

Under certain conditions, especially when the initial sound of a word or phrase is a fricative sound such as *f, v, s,* or *z,* the high-frequency components may predominate such that the squelch gate is not immediately operative and, therefore, a first syllable of a word may be lost. Ordinarily, this loss of a first syllable will not cause the loss of intelligence. Since the release time or hold time is approximately 1.5 seconds, fricative sounds within an uninterrupted sentence ordinarily do not cause the squelch to open the receiving circuit.

During periods of voice transmission with weak interference present, the operation of the squelch circuit continues as if only voice signal were present. When interference becomes so strong as to render voice unintelligible, the increase in control voltage output from the high-frequency channel of the squelch circuit is proportionally greater than the increase in output from the low-frequency channel. When the voltage from the high-frequency channel becomes sufficiently high as determined by the setting of potentiometer 20 to cancel substantially the voltage derived from the low-frequency channel, the squelch circuit opens the signal output circuit for eliminating the noise.

When the input of the squelch circuit comprises only white noise, the noise is filtered out by capacitors 29 and 32 so that signal variations are not applied through capacitors 30 and 33 for developing output control voltage. Periodic impulse noises such as developed by corona high-voltage lines, from ignition noise, or from electric motors, are also filtered by capacitors 29 and 32 when the repetition rate is higher than approximately 80 cycles per second. When the repetition rates are lower, control voltage is developed by both syllabic rate detectors such that when the threshold control potentiometer 20 is set properly the outputs of the two channels will cancel in the summing circuit.

Interference from a source of continuous tone will produce a direct-current voltage at the output of either or both the high-frequency and low-frequency filters. However since this voltage is nonvarying, it will not be coupled through either capacitors 30 or 33 to the output circuits of the squelch system. Adjacent channel interference will ordinarily contain a preponderance of high-frequency components which develop greater votlage at the output of the high-frequency channel so that the squelch gate circuit prevents the application of demodulated signal to the output circuit of the receiver.

The voice-operated squelch is easily adapted to any existing receiver, particularly to those with a fixed audio gain followed by an attenuator in the speaker circuit. If sufficient audio-frequency output voltage is available, the squelch circuit may be connected directly across the receiver audio output terminals. A sensitive relay coil may be connected across the squelch output terminals for operating contacts connected in the speaker line.

According to the voice-operated squelch system described by Fedde et al., previously cited, one of the two channels of the voice-operated squelch circuit operates within the frequency range of the voice signal whereas the other channel passes higher frequencies than those generally contained within the range of the voice frequencies. In the instant system both channels operate within the audio-frequency range of voice signal so that this squelch circuit is applicable to narrow-band systems.

The main advantage of the instant voice-operated squelch is its ability to recognize fundamental speech characteristics. By concentrating on two distinctive characteristics of speech; namely, its preponderance of energy below 1,000 cycles per second and its continually varying amplitude, it is possible to discriminate against most types of noise and interference. This makes it an ideal single side-band squelch because it is independent of radio-frequency amplitude and envelope. Since the squelch operates directly off the voice wave form, it may of course be used as well for other types of voice modulation such as amplitude modulation and frequency modulation.

The squelch circuit of this invention may be modified in obvious ways by those skilled in the art and still be in the spirit and scope of the following claims.

What is claimed is:

1. In a radio receiving system having a demodulator, a switching control circuit having first and second syllabic rate detectors, first and second filter circuits coupling said demodulator to the inputs of said first and second syllabic rate detectors respectively, said first filter circuit having a frequency band-pass characteristic for passing signal and noise normally having a greater signal-to-noise ratio than that passed by said second filter circuit, a switching circuit, means for applying the difference in the voltages derived from the outputs of said first and second syllabic rate detectors to said switching circuit, and said switching circuit operating in response to the ratio of the output voltage of said first syllabic rate filter to the output voltage of said second syllabic rate filter exceeding a predetermined value.

2. In a communication receiving system, a squelch control circuit responsive to syllabic rate, said squelch control circuit comprising, an input circuit to which is applied demodulated signal that is derived from a signal channel susceptible to noise interference, a voltage comparison circuit, an output circuit connected to said voltage comparison circuit, a high-frequency band-pass channel and a low-frequency band-pass channel connected between said input circuit and said voltage comparison circuit, each of said channels comprising in cascade a frequency band-pass filter connected to said input circuit, a rectifier, and a syllabic rate detector connected to said voltage comparison circuit, the band-pass filter in said low-frequency channel having the frequency characteristic for passing a portion of said demodulated signal within a restricted range of low frequencies containing a relatively large amount of its signal power, the band-pass filter in said high-frequency channel having the frequency characteristic for passing a portion of said demodulated signal within a frequency range higher than said low frequencies, and said voltage comparison circuit developing voltage greater than a predetermined value for enabling an audio-frequency signal channel of said receiving system in response to the ratio of the output of said low-pass channel to the output of said high-frequency channel exceeding a predetermined value.

3. In a communication receiver having a demodulator for supplying demodulated signal, and an output circuit to which intelligible signal is to be applied, a signal-to-noise squelch circuit comprising a low-frequency channel and a high-frequency channel, a transformer coupling said demodulator to the input circuit of each of said channels, each of said channels comprising in cascade a band-pass filter, a rectifier, and a syllabic detector, a gate circuit for enabling said output circuit of said receiver, voltage comparison means for comparing the outputs of said syllabic rate filters and applying the difference of said outputs to said gate circuit, adjustable voltage divider means connected to the outputs of said rectifiers, said divider means being adjusted to predetermine the ratio of the output voltages of said rectifiers developed for application to said respective syllabic rate detectors, each of said syllabic rate detectors comprising a low-frequency coupling means and rectifying means connected between said respective rectifier and said voltage comparison circuit, said band-pass filter of said low-frequency channel passing substantial power from said demodulated signal, said band-pass filter of said high-frequency channel passing higher frequencies of said demodulated signal with less power, and said gate circuit enabling said output circuit of said receiver in response to the ratio of the output of said low-frequency channel to the output of said high-frequency channel exceeding a predetermined value as determined by adjustment of said voltage divider means.

4. A voice controlled circuit for enabling a signal system including a signal circuit, an output circuit, and a gate connected between said signal circuit and said output circuit, and said voice controlled circuit comprising; a low pass filter for a frequency band pass having a center frequency low in the audio frequency range, a high pass filter for a frequency band pass having a center frequency in the audio frequency range at a substantially higher frequency level than the center frequency of said low pass filter, a first syllabic rate filter connected to the output of said low pass filter and being adapted for passing substantially all syllabic varying amplitude signals beneath a repetition rate of approximately 25 cycles per second, said first syllabic rate filter being adapted for providing power output as a function of the energy of audio signal passed through said low pass filter, a second syllabic rate filter connected to the output of said high pass filter and being adapted for passing substantially all syllabic varying amplitude signals beneath a repetition rate of approximately 25 cycles per second, and means for summing the outputs of both the first and second syllabic rate filters and for applying the resulting output for control of said gate and enabling the signal system.

5. The voice controlled circuit of claim 4, wherein the center frequency of the frequency band pass of the low pass filter is approximately 450 cycles per second, and the center frequency of the high pass filter is approximately 2,500 cycles per second.

6. A voice operated squelch circuit for an audio frequency system having an audio frequency signal circuit, an output circuit, and a gate connected between said audio frequency signal circuit, and said output circuit, and with said voice operated squelch circuit comprising; a low pass filter and a high pass filter, both filters being signal fed from said audio frequency signal circuit, first rectifier means and second rectifier means for rectifying output from said low pass filter and said high pass filter respectively, a first syllabic rate filter and a second syllabic rate filter being fed rectified outputs of said low pass filter and said high pass filter respectively, third rectifier means and fourth rectifier means for rectifying the outputs of said first syllabic rate filter and said second syllabic rate filters respectively, and signal summing means for combining the output signals of said third rectifier means and said fourth rectifier means, and said signal summing means being connected for feeding an enabling signal to said gate.

References Cited in the file of this patent

UNITED STATES PATENTS

| | | |
|---|---|---|
| 2,026,305 | Fisher | Dec. 31, 1935 |
| 2,254,733 | Dickieson | Sept. 2, 1941 |
| 2,743,361 | Bauman | Apr. 24, 1956 |
| 2,801,336 | Neeteson | July 30, 1957 |
| 2,849,529 | Parker | Aug. 26, 1958 |
| 2,852,622 | Fedde et al. | Sept. 16, 1958 |
| 2,908,761 | Raisbeck | Oct. 13, 1959 |
| 2,927,997 | Day | Mar. 8, 1960 |